Oct. 12, 1965
L. MICELI
3,211,081
BARBECUE DEVICE
Filed May 2, 1963
2 Sheets-Sheet 2
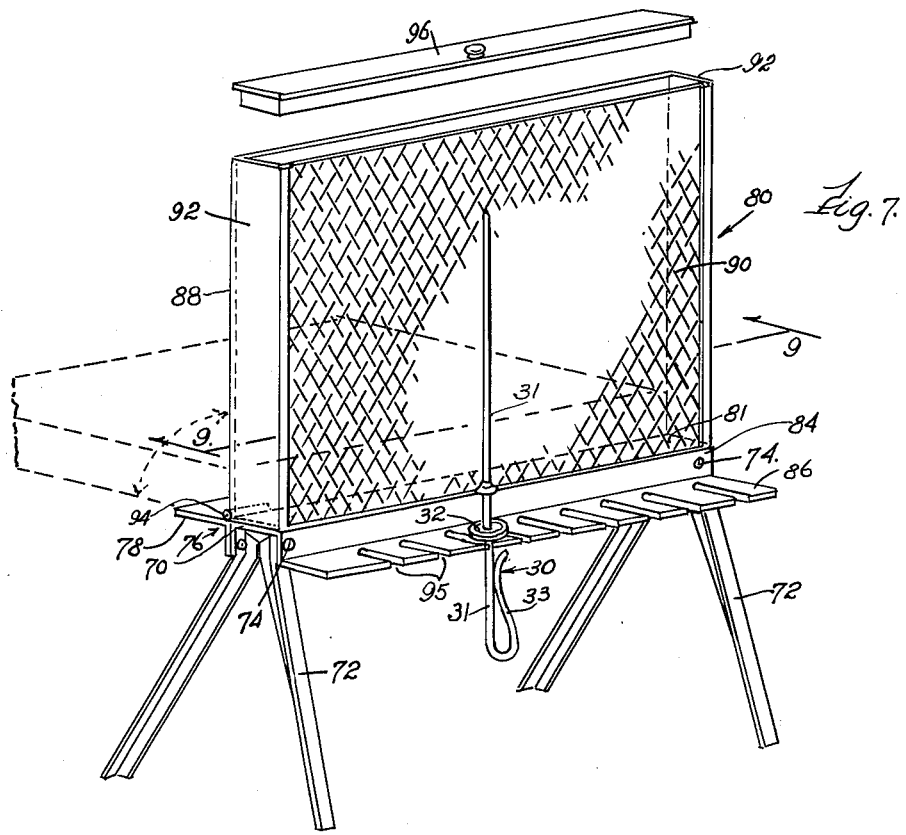
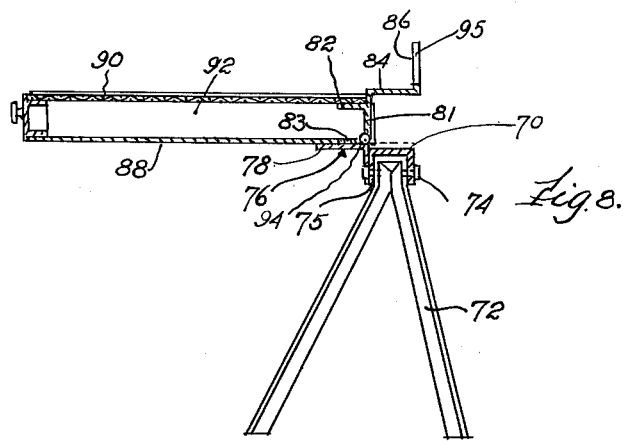
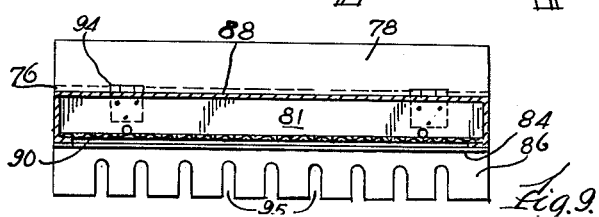
INVENTOR.
Leonard Miceli
BY
Attorney.

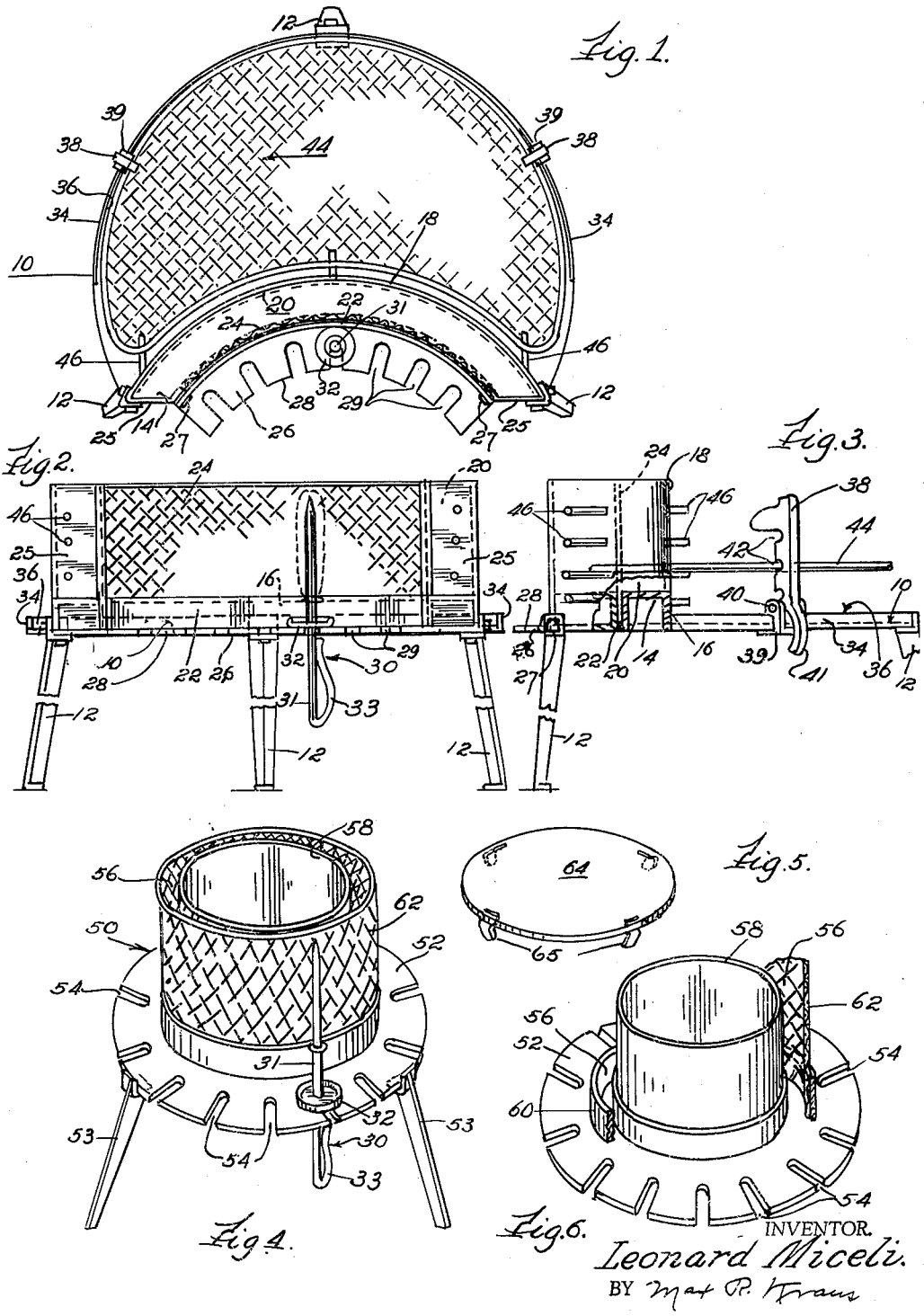

United States Patent Office 3,211,081
Patented Oct. 12, 1965

3,211,081
BARBECUE DEVICE
Leonard Miceli, 450 N. May St., Chicago 22, Ill.
Filed May 2, 1963, Ser. No. 277,561
9 Claims. (Cl. 99—421)

This invention relates to a barbecue device.

One of the objects of this invention is to provide a barbecue device in which the food to be barbecued is supported on individual spits and readily positioned on the unit for barbecuing and the like.

Another object of this invention is to provide a barbecue grill which has means for cooking and the like.

Other objects will become apparent as this description progresses.

In the drawings:

FIG. 1 is a top plan view of one embodiment of this invention.

FIG. 2 is a front elevational view thereof.

FIG. 3 is a side elevational view thereof.

FIG. 4 is a frontal perspective of a modification.

FIG. 5 is a perspective view of the cover used in connection with the structure of FIG. 4.

FIG. 6 is a perspective of a fragmental broken circular portion of the FIG. 4 embodiment.

FIG. 7 is a perspective view of another modification.

FIG. 8 is a side view of the FIG. 7 embodiment, shown in tilted horizontal position, and FIG. 9 is a top plan view taken on lines 9—9 of FIG. 7.

Reference will first be made to the structure shown in FIGS. 1 to 3 inclusive.

In the embodiment shown in FIGS. 1 to 3, there is provided a horizontally supported table member generally indicated at 10, which is supported by a plurality of detachable legs 12. The legs are detachably secured to the table member 10 at three spaced points by suitable fastening means. The legs are detachable to permit collapsing of the unit.

The table member 10 in plan is of generally arcuate shape, as best shown in FIG. 1, and is generally flat, except for the front portion thereof which is bent to form an inverted U-shape and provide an elevated or raised base or bottom 14, as best seen in FIG. 3. The aforementioned raised portion is of arcuate shape in plan and extends along the front of the supported table member.

Permanently secured to the rear vertical wall 16 of the raised portion is an arcuate shaped wall 18 which extends across the front of the unit and forms the back wall of the charcoal trough which is generally indicated at 20, to be described. Secured to the front vertical wall 22 of the raised portion of the table by permanent means is a screen 24 which forms the front wall of the charcoal trough 20. The screen 24 is likewise of arcuate shape. The opposite ends of the trough are closed by end walls 25 suitably secured to the front screen wall and the rear wall. The charcoal which forms the fuel is positioned in holder or trough 20 and when lit the heat therefrom will pass forwardly through the screen 24.

Also secured to the vertical front wall 22 of the table is an apron which is generally L-shaped in section and indicated generally by the numeral 26. The apron is secured by suitable fastening means 27. The apron is also of arcuate shape in plan and the horizontal wall 28 of the apron is provided with a plurality of spaced slots 29 adapted to receive the spits 30 to be described.

The spit is shown best in FIG. 2 and comprises a stem 31 with a pointed end. A dish-shaped disc 32 is permanently secured to the stem above the handle end designated by the numeral 33. The meat or other food to be barbecued is positioned on the spit, as shown in dotted lines in FIG. 2, and the spit is inserted in any one of the slots 29 in the apron so that the spit is supported in a vertical position by resting on the dish-shaped disc or plate 32 which engages the top of the apron, to support the meat product in a vertical position forwardly of the arcuate shaped screen 24, to receive the heat from the charcoal in the holder portion. It can be appreciated that the spit is readily inserted and removed from the slots 29 in the apron 26.

The table member 10 of the unit rearwardly of the arcuate shaped charcoal holder 20 may be used to form a second heating compartment. The edge of the table is turned upwardly to form a lip or flange 34 and this helps form a trough-like table portion 36 into which charcoal may be positioned and burned. The table member 10 is provided with a plurality of spaced pivotally supported upright members 38 which are secured to the table by brackets 39 and are pivotally supported as at 40 on said brackets. Each of said members 38 may be pivoted rearwardly by engaging the lower extension 41 and applying manual pressure and this will cause the member 38 to pivot rearwardly for the purpose to be described.

The front portion of the upright members 38 are provided with spaced recesses or slots 42 into which a screen member or grid, generally indicated by the numeral 44, is inserted, and these members engage the outer edge of the screen or grid to support same. The spaced recesses 42 permit the screen or grid to be positioned in any number of elevated positions. Two of such holders are shown supporting the outer edges of the screen.

The back wall 18 of the front charcoal holder 20 has secured thereto and extending rearwardly thereof a plurality of spaced pins 46 which serve to support the front end of the screen member or grid 44. As shown in FIG. 3, the front portion of the screen is supported on pins 46, with the outer portion of the screen supported in one on the recesses of the upright member 38. The screen or grid 44 is readily secured in any of the recesses 42 of the upright member 38. Rearward pivoting of the upright member 38 will permit the screen 44 to be withdrawn. The upper portion of the upright member 38 is counter-weighted so that member 38 will maintain its vertical position when thus positioned.

There is thus provided two separate heating and/or cooking compartments, one for barbecuing the meat on the spit which is supported in a vertical position, and the other for cooking steaks or other meats which may be positioned in a horizontal position on the grid or screen 44.

Reference will now be made to the structure shown in FIGS. 4 to 6 inclusive.

In this embodiment the table is generally designated by the numeral 50 and is formed of a circular top section 52 supported by a plurality of detachably mounted legs 53 secured thereto in any conventional manner. Equally spaced around the circular top section 52 are slots 54 which are adapted to receive the spits 30 in the manner previously described. Supported on the table is a circular trough generally indicated at 56 for receiving the charcoal. The circular trough or holder is formed of an inner circular wall 58 permanently secured to the table top section 52. Spaced therefrom is a short outer circular band 60 also permanently secured to the table top. Permanently secured to the outer circular band 60 is a circular screen member 62 which forms the front wall of the charcoal holder or trough 56. The charcoal is positioned on the table within the holder or trough 56 up to the top of the band 60 and when the charcoal is burning the heat therefrom will pass through the screen wall 62 to barbecue the food on the spits 30.

A cover plate 64 is provided with spring fingers 65 and same is detachably supported on the top of the unit, with the spring fingers engaging the top of the screen wall 62. The cover plate 64 is heated by the heat from the charcoal holder or trough 56 and may be used for cooking steaks when placed thereon.

The structure shown in FIGS. 7 and 8 will now be described.

This structure comprises a generally rectangular shaped channel bar 70. Secured to the opposite ends of the channel bar are legs 72 which are detachably secured by suitable fastening means 74. Permanently secured to the rear wall 75 of the channel bar 70 is an inverted L-shaped member 76, the horizontal portion 78 of which extends above the top of the channel bar 70.

The cooking or barbecuing unit designated generally by the numeral 80 is pivotally supported so that it may be positioned in a vertical position, as shown in FIG. 7, or may be pivoted or tilted rearwardly to a horizontal position, as shown in FIG. 8. The cooking or barbecuing unit has a bottom wall 81 which has short upwardly extending spaced front and rear sides 82 and 83 and a forwardly, downwardly depending wall 84 which extends horizontally forwardly to form an apron 86. The rear wall 88 of the cooking unit 80 is secured to the bottom rear side 83. A screen 90 forming the front wall of the cooking unit is secured to the front side 82. Completing the cooking unit are end walls 92 secured to the screen 90 and to the rear wall 88.

The cooking unit is pivotally attached to the channel bar 70 by conventional hinging means 94 which permits the cooking unit to be pivoted from the vertical to the horizontal position shown. The forwardly extending apron portion 86 is provided with spaced slots 95 to receive the spits 31 in the manner previously described. A hood or closure 96 is removably secured to the top of the unit.

The charcoal is positioned on the bottom wall 81 of the cooking unit and the heat therefrom will pass through the screen 90 to barbecue the food on the spit which is positioned forwardly thereof. If it is desired to use the unit for cooking steaks or the like, the unit may be pivoted to a horizontal position as shown in FIG. 8, or in dotted lines in FIG. 7, and in this position the heat will pass upwardly through the screen and will cook the meat lying horizontally thereon.

It will be understood that various changes and modifications may be made from the foregoing without departing from the spirit and scope of the appended claims.

What is claimed is:

1. A food cooking apparatus comprising a stand, a trough supported on said stand in an elevated position from a supporting surface on which said stand is positioned, said trough adapted to receive a solid combustible fuel, a screen at the front of said trough, spit supporting means extending forwardly of said trough and having a plurality of slots, a plurality of spits removably supported only on said spit supporting means in said slots in a vertical upright position forwardly of the screen, each spit having a food piercing member at one end and a handle portion for manual engagement at the opposite end, and means on the spit between said opposite ends for engaging said spit supporting means adjacent said slots to support the food piercing end and the food thereon in an upright position with the food piercing end extending upwardly and forwardly of the screen and with the handle positioned below the spit supporting means and above and clear of the supporting surface, said handle when in said last mentioned position being exposed for manual engagement wherein the spit may be readily removed from said spit supporting means by manual engagement of said handle and sliding same outwardly in said slot, said spit serving to support the food during the cooking thereof and also serving as a carrier for the said food when the spit is removed from the spit supporting means wherein the spit may be carried by manual engagement of said handle.

2. A structure defined in claim 1 in which the trough is of arcuate shape.

3. A structure defined in claim 1 in which the trough is of circular shape.

4. A structure defined in claim 1 in which the trough is of generally rectangular shape.

5. A structure defined in claim 4 in which the trough is movable from a vertical to a horizontal position.

6. A structure defined in claim 1 which includes a second trough on said stand positioned rearwardly of the first mentioned trough.

7. A structure defined in claim 6 in which the second trough has a screen member extending horizontally over said second trough.

8. A structure defined in claim 6 in which the screen member over the second trough is adjustable to a plurality of different elevations.

9. A structure defined in claim 6 in which the second trough is provided with pivotally mounted uprights for supporting the screen over the second trough.

References Cited by the Examiner

UNITED STATES PATENTS

| | | | |
|---|---|---|---|
| 1,588,530 | 6/26 | Currier | 99—421 |
| 2,211,024 | 8/40 | Nardin | 97—339 |
| 2,477,529 | 7/49 | Sprinkle et al. | 99—421 |
| 2,590,470 | 3/52 | Skocic | 99—421 |
| 2,894,477 | 7/59 | Persinger et al. | 99—421 |
| 2,935,013 | 5/60 | Onori | 99—419 |
| 3,009,410 | 11/61 | Murphy | 99—421 |
| 3,079,909 | 3/63 | Bemben | 99—421 |

ROBERT E. PULFREY, *Primary Examiner.*

GEORGE A. NINAS, JR., LAWRENCE CHARLES,
*Examiners.*